(12) United States Patent
Tanaka et al.

(10) Patent No.: US 8,085,167 B2
(45) Date of Patent: Dec. 27, 2011

(54) PARKING ASSIST APPARATUS

(75) Inventors: Yu Tanaka, Aichi-gun (JP); Jun Kadowaki, Anjo (JP); Kazuya Watanabe, Anjo (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 274 days.

(21) Appl. No.: 12/442,474

(22) PCT Filed: Oct. 29, 2007

(86) PCT No.: PCT/JP2007/071039
§ 371 (c)(1),
(2), (4) Date: Mar. 23, 2009

(87) PCT Pub. No.: WO2008/056560
PCT Pub. Date: May 15, 2008

(65) Prior Publication Data
US 2010/0089677 A1    Apr. 15, 2010

(30) Foreign Application Priority Data
Nov. 7, 2006    (JP) .................................. 2006-301586

(51) Int. Cl.
*B60Q 1/48*    (2006.01)
*G08G 1/14*    (2006.01)

(52) U.S. Cl. ........ 340/932.2; 340/937; 701/41; 180/204

(58) Field of Classification Search ............... 340/932.2, 340/436, 435, 937; 701/1, 28, 36, 41, 43; 180/199, 204, 168; 348/333.02, 148
See application file for complete search history.

(56) References Cited

U.S. PATENT DOCUMENTS
6,223,847 B1    5/2001    Shimizu et al.
(Continued)

FOREIGN PATENT DOCUMENTS
DE    100 41 381 A1    4/2001
(Continued)

OTHER PUBLICATIONS

Supplementary European Search Report issued in European Application No. 07830773.3-1264 dated May 7, 2010 (5 pages).

(Continued)

*Primary Examiner* — Van T. Trieu
(74) *Attorney, Agent, or Firm* — Sughrue Mion, PLLC

(57) ABSTRACT

A view in front of a vehicle (1) is captured, and the captured imaged is displayed on a display section. At a predetermined stop position (S1), a target parking position (S4) of the vehicle (1) is set based on the captured image. Then, a reverse guidance route (C2) is calculated. The reverse guidance route (C2) is a route located forward of the vehicle (1), in front of the stop position (S1), and lies from a reverse start position (S2), at which the vehicle (1) starts to reverse for parking, up to the target parking position (S4). Based on the captured image, the reverse start position (S2) is set within a predetermined setting area by an instruction of an occupant of the vehicle (1). A forward travel guidance route (C1) from the stop position (S1) to the reverse start position (S2) is calculated, and conditions of movement of the vehicle (1) are detected. The vehicle (1) is guided from the stop position (S1) up to the reverse start position (S2) based on the forward travel guidance route (C1) and on the movement conditions.

7 Claims, 8 Drawing Sheets

U.S. PATENT DOCUMENTS

| | | | |
|---|---|---|---|
| 6,275,754 B1 * | 8/2001 | Shimizu et al. | 701/41 |
| 6,356,828 B1 * | 3/2002 | Shimizu et al. | 701/41 |
| 6,424,895 B1 * | 7/2002 | Shimizu et al. | 701/41 |
| 6,611,744 B1 * | 8/2003 | Shimazaki et al. | 701/41 |
| 6,825,880 B2 * | 11/2004 | Asahi et al. | 348/333.02 |
| 7,024,286 B2 * | 4/2006 | Kimura et al. | 701/1 |
| 7,075,456 B2 * | 7/2006 | Tanaka et al. | 340/932.2 |
| 7,375,651 B2 * | 5/2008 | Shimazaki et al. | 340/932.2 |
| 7,486,203 B2 * | 2/2009 | Tanaka et al. | 340/932.2 |
| 7,599,773 B2 * | 10/2009 | Tanaka et al. | 701/36 |
| 7,755,511 B2 * | 7/2010 | Yamamoto et al. | 340/932.2 |
| 2002/0005779 A1 | 1/2002 | Ishii et al. | |

FOREIGN PATENT DOCUMENTS

| | | |
|---|---|---|
| EP | 1 950 097 A1 | 7/2008 |
| EP | 2 003 021 A2 | 12/2008 |
| JP | 10-264841 A | 10/1998 |
| JP | 11-001177 A | 1/1999 |
| JP | 2001-063597 A | 3/2001 |
| JP | 2001-347909 A | 12/2001 |
| JP | 2002-240661 A | 8/2002 |
| JP | 2003-104149 A | 4/2003 |
| JP | 2004-306814 A | 11/2004 |
| JP | 2006-160147 A | 6/2006 |
| JP | 2007-137171 A | 6/2007 |

OTHER PUBLICATIONS

Korean Office Action dated Mar. 24, 2011 issued in corresponding Korean Patent Application No. 10-2009-7008057.

* cited by examiner (a)

(b)

PARKING ASSIST APPARATUS

TECHNICAL FIELD

The invention relates to a parking assist apparatus assisting driving operation when parking a vehicle.

BACKGROUND ART

A vehicle autopilot system is disclosed in Japanese published unexamined patent application (Patent Document 1) described below as this type of parking assist apparatus. A vehicle is guided by the autopilot system in a manner that moves forward from a start position and moves rearward to a target position via a turn position. If a target position is set in a state that the vehicle is stopped, the autopilot system sets the stop position as the start position. Thus, the start position and the target position are determined, and the autopilot system sets the turn position and calculates a forward movement path and a rearward movement path. A current position of the vehicle, a parking target position, a turn position, a moving path from the start position to the parking position, and the like are displayed on a liquid crystal monitor.
Patent Document 1: JP11-1177A (Paragraph 35 to 42, FIG. 2 and the like)

DISCLOSURE OF INVENTION

Once the autopilot system determines the start position, an occupant is able to park a vehicle smoothly by only operating creep driving. However, the turn position is also determined by the autopilot system. Hence, if there is an obstacle on the forward movement path or the forward movement path is not secured in a narrow parking, the autopilot system is not operable. The parking assist apparatus including the autopilot system is particularly needed for occupants who are not good at parking. Such occupants have a strong demand for using the parking assist apparatus, in particular, when parking in narrow spaces.

The present invention is created in the view of the foregoing drawback. The purpose of the invention is to provide a parking assist apparatus which allows the occupant of the vehicle to easily set a position where the vehicle starts rearward movement for parking.

To achieve the above-described object, a parking assistance apparatus according to the present information is characterized by including an image capturing portion capturing an image of a forward direction of a vehicle, a display portion displaying a captured image, a parking target position setting portion setting a parking target position of the vehicle based on the captured image when the vehicle is in a predetermined stop position, a rearward movement path calculating portion calculating a rearward movement guide path from a rearward movement start position, which is located anterior to the predetermined stop position by the vehicle and is a position where the vehicle starts rearward movement for a parking, to the parking target position, a rearward movement start position setting portion setting the rearward movement start position in a predetermined set range based on the captured image by following an instruction from an occupant of the vehicle when the vehicle is in the predetermined stop position, a forward movement path calculating portion calculating a forward movement guide path from the predetermined stop position to the rearward movement start position, a moving state detecting portion detecting a moving state of the vehicle, and a guide portion guiding the vehicle from the predetermined stop position to the rearward movement start position based on the forward movement guide path and based on the moving state.

According to this structure, the rearward movement start position is set by the instruction from the occupant of the vehicle within the predetermined set range. If the occupant sets the rearward movement start position arbitrarily, the occupant finds it difficult to determine where to set the rearward movement start position, and thus a convenience may be impaired. In this structure, however, the rearward movement start position is easily set without impairing the convenience because the occupant sets the rearward movement start position within the predetermined set range.

Further, the parking assistance apparatus according to this invention includes a superimposing portion superimposing a marker showing the rearward movement start position on the captured image, where the rearward movement start position setting portion sets the rearward movement start position by the instruction of the occupant of the vehicle based on the marker. Further, preferably, the rearward movement start position setting portion of the parking assistance apparatus including a superimposing portion superimposing a marker showing the rearward movement start position on the captured image moves a position of the marker on the captured image in conjunction with the instruction of the occupant within a predetermined area of the captured image.

According to this structure, the marker showing the rearward movement start position is superimposed on the captured image and the occupant sets the rearward movement start position based on the marker. Consequently, the occupant sets the rearward movement start position easily considering an obstacle and a space of a parking area.

Further, the parking assistance apparatus according to this invention is characterized in that the rearward movement start position is set at a position instructed by a steering operation of the occupant.

According to this structure, the rearward movement start position is set by the steering operation of the occupant. It is possible to adjust and fix the rearward movement start position by use of, for example, an input means including a touch pad or a switch provided on the display portion. In this case, the occupant needs to take at least one of his/her hands off a steering wheel for a certain period of time for adjusting. However, according to this characteristic structure, the rearward movement start position is set by the steering operation. Consequently, the occupant adjusts and fixes the rearward movement start position without taking his/her hand off the steering wheel. Even though the occupant needs to take his/her hand off the steering wheel when fixing the rearward movement start position, a period of time for fixing is much shorter than the period of time for adjusting. In addition, the occupant sets the rearward movement start position easily without feeling uncomfortable because the steering operation is similar to that for a normal driving.

Further, the parking assistance apparatus according to this invention is characterized in that an initial rudder angle of the forward movement guide path is a steering angle operated in order for instructing the rearward movement start position.

When the rearward movement start position is set, the forward movement guide path from the predetermined stop position to the rearward movement start position is set. When the initial rudder angle of the forward movement guide path coincides with the steering angle operated when instructing the rearward movement start position, there is no need for operating the steering wheel when starting a forward movement. Consequently, a smooth parking assistance is achieved.

Further, the parking assistance apparatus according to this invention is characterized in that the predetermined set range of the rearward movement start position is a range where the rearward movement guide path may be formed.

Preferably, the predetermined set range of the rearward movement start position is a range that the forward movement guide path may be formed from the predetermined stop position and the rearward movement guide path may be formed from the set rearward start position to the parking target position.

If the occupant sets the rearward movement start position arbitrarily, a possibility may arise that the guide path is not formed and thus the convenience may be impaired. In this structure, however, the occupant sets the rearward movement start position easily without impairing the convenience because the occupant sets the rearward movement start position within the predetermined set range, where the rearward movement guide path may be formed. In some cases, such as in a small place, the forward movement guide path may not be formed. So, it is more preferred that the range where both the forward movement guide path and the rearward movement guide path may be formed be set as the predetermined set range of the rearward movement start position Further, the parking assistance apparatus according to this invention is characterized in that the guide portion guides the vehicle from the rearward movement start position to the parking target position based on the rearward movement guide path and the moving state.

According to this structure, the parking assist apparatus performs guiding from the rearward movement start position to the parking target position set by the occupant. Consequently, by applying this invention, the parking assist apparatus having a convenience is provided.

DETAILED DESCRIPTION OF THE EXEMPLARY EMBODIMENTS

Figure 1:
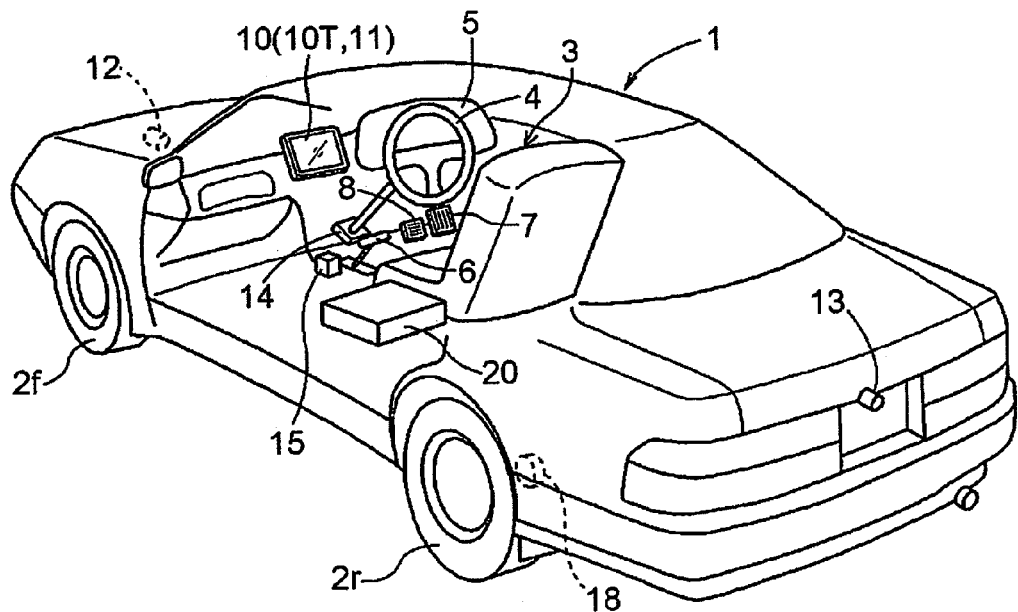
FIG. 1 is a perspective view showing a driver seat when viewed by cutting a part of a vehicle.
Figure 2:
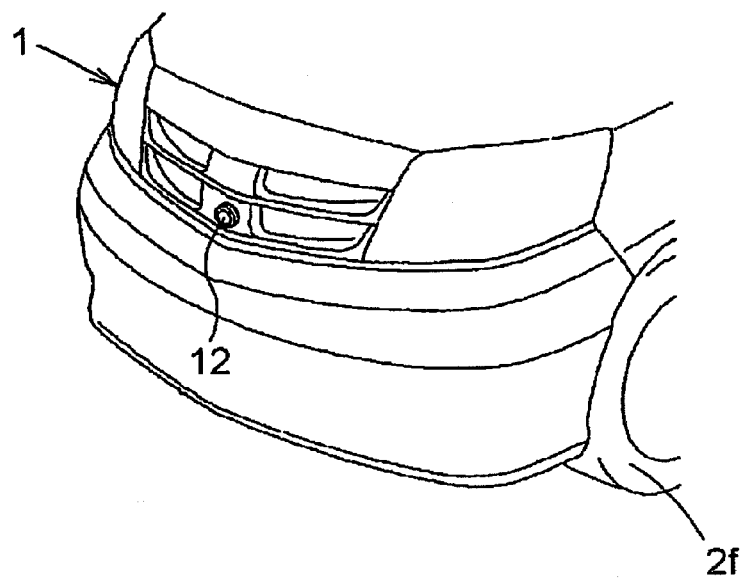
FIG. 2 is a perspective view of a front portion of the vehicle.
Figure 3:
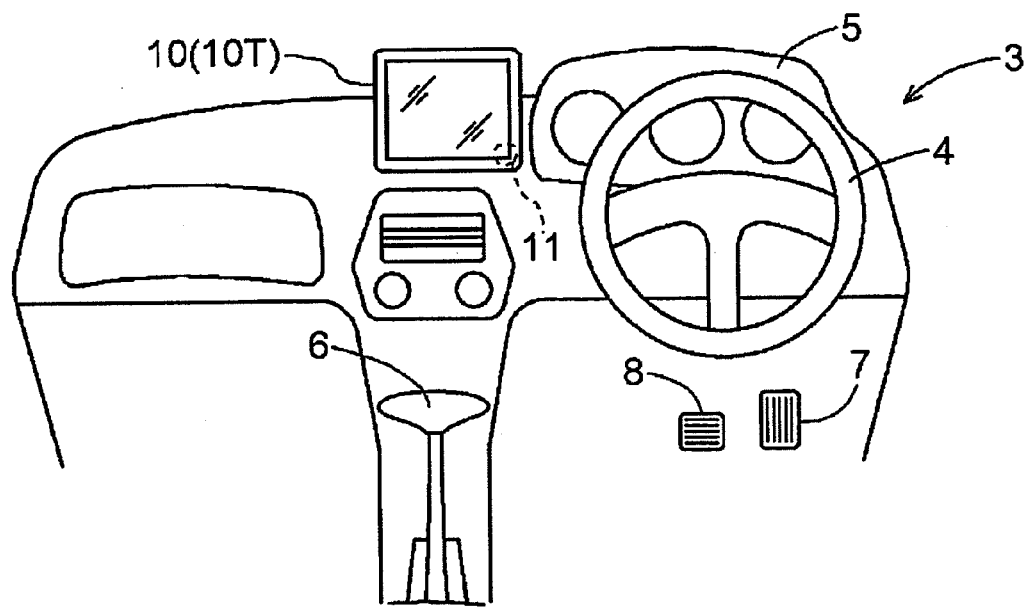
FIG. 3 is an explanatory view of a front portion of the driver seat.
Figure 4:
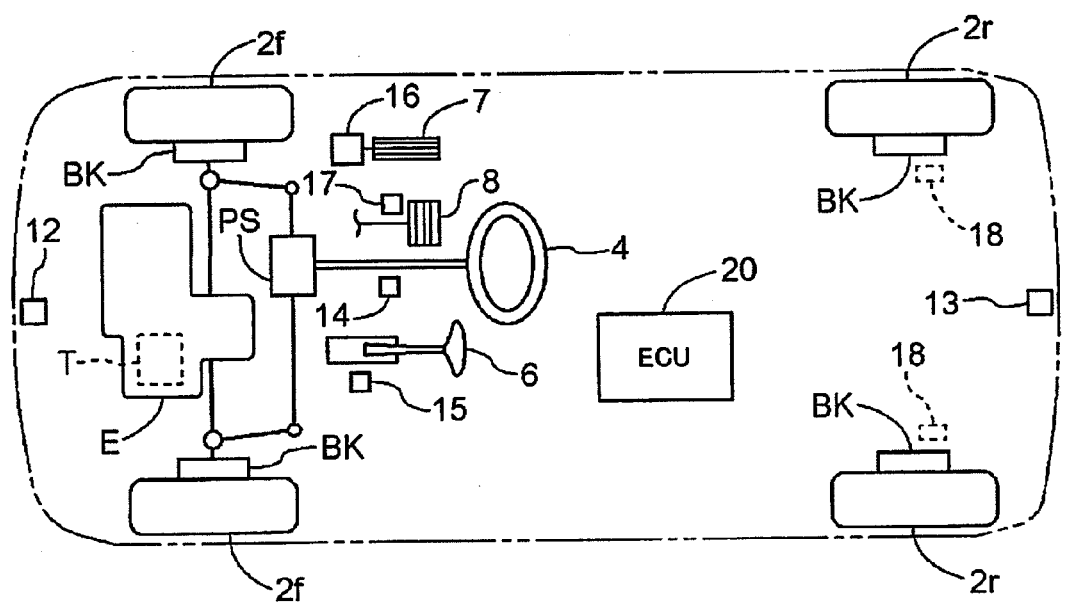
FIG. 4 is a plain view schematically showing a configuration of each portion of the vehicle.

Hereinafter, an embodiment of the invention will be described with reference to drawings. Firstly, a basic configuration of a vehicle 1 will be described with reference to FIGS. 1 to 4. A steering wheel 4 of a driver seat 3 interlocks with a power steering unit PS transmitting a rotational operating force to front wheels $2f$ to conduct driving operation. An engine E and a gearshift mechanism T, which is made of a torque converter, a CVT, or the like, are disposed at a front portion of the vehicle. The torque converter shifts gears and transmits power from the engine E to the front wheels $2f$. An accelerator pedal 7, serving as an accelerator operating member for controlling a running speed, and a brake pedal 8, operating a brake apparatus BK of the front wheels $2f$ and rear wheels $2r$ to apply a braking force to the front and rear wheels $2f$ and $2r$, are arranged in parallel in a vicinity of the driver seat 3.

A monitor 10 (display portion), in which a touch panel 10T is formed on a display surface, is provided at an upper position of a console around the driver seat 3. The monitor 10 is provided with a speaker 11. The speaker 11 may be provided at a panel 5 or an inside of a door. A front camera 12 (an image capturing portion) is provided at a front end of the vehicle 1 and a rear camera 13 is provided at a rear end of the vehicle 1. The monitor 10 is a liquid crystal display including a backlight. Obviously, a plasma type display or a CRT type display may be employed as the monitor 10. A pressure sensitive type touch panel or an electrostatic type touch panel may be used as the touch panel 10T, and a position with which fingers or the like contact is output as a location data. It is desirable that a display device for a navigation system is used as the monitor 10.

The front camera 12 and the rear camera 13 are digital cameras, each of which includes an imaging device such as a charge coupled device (CCD) or a CMOS image sensor (CIS) and output the captured information as motion information. The front camera 12 is installed so as to aim at a forward direction of the vehicle 1 having a depression angle, and the rear camera is installed so as to aim at a rearward direction of the vehicle 1 having a depression angle. The respective cameras are capable of outputting motion pictures in real time.

The operation system of the steering wheel 4 includes a steering sensor 14, thereby measuring the direction and the amount of the steering operation. The operation system of the shift lever 6 includes a shift position sensor 15, thereby determining the shift position. The operation system of the accelerator pedal 7 includes an acceleration sensor 16, thereby measuring the operation amount. The operation system of the brake pedal 8 includes a brake sensor 17, thereby detecting the presence or absence of the operation.

Further, a rotation sensor 18, measuring a rotation amount of at least one of the front wheels $2f$ and the rear wheels $2r$, is provided as a moving distance sensor. Obviously, the moving amount of the vehicle 1 may be measured based on the rotation amount of the driving system in the gearshift mechanism T. Furthermore, an electronic control unit 20 (ECU), which conducts running control including the parking assist, is provided at the vehicle 1.

Figure 5:
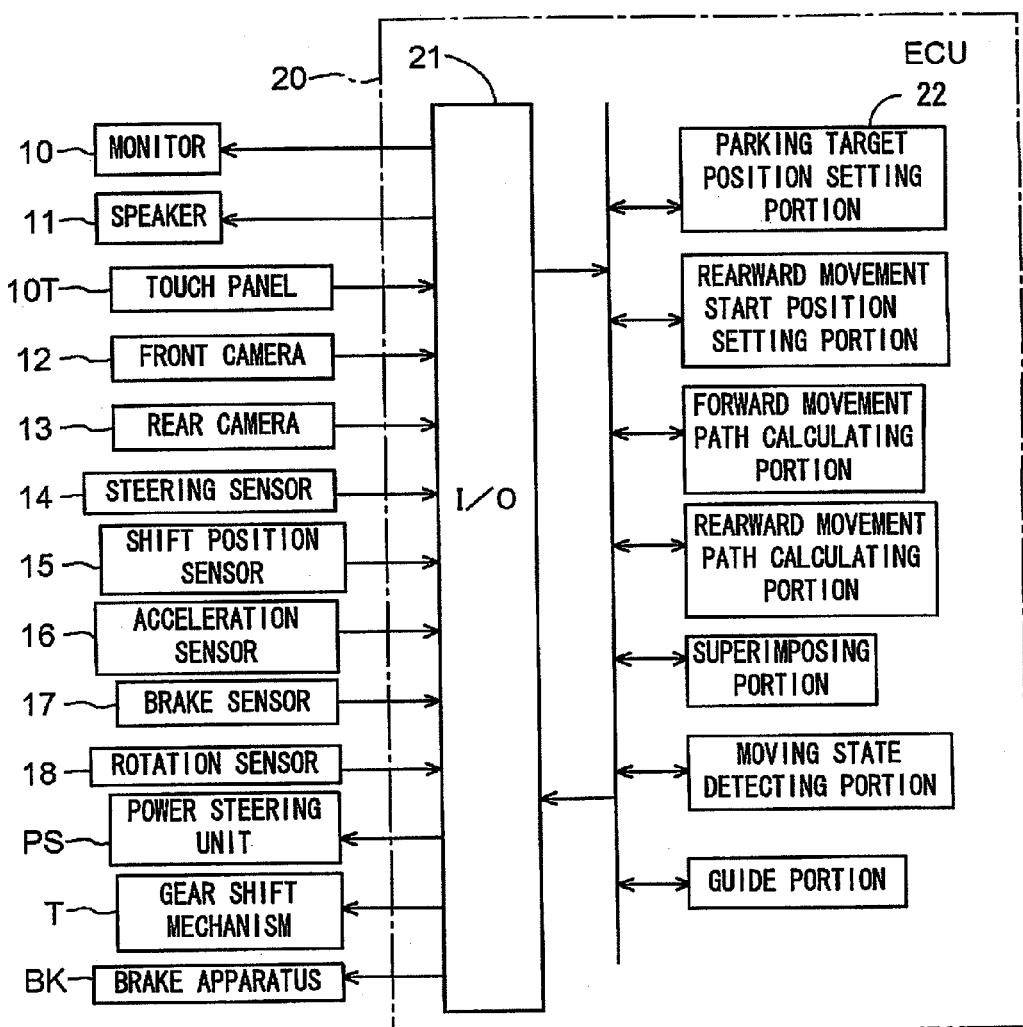
FIG. 5 is a block diagram schematically showing a configuration of a parking assist apparatus of the present invention.

FIG. 5 is a block diagram schematically showing a configuration of the parking assist apparatus of the present invention. The parking assist apparatus of the present invention is mainly configured by the ECU 20. The ECU 20 is provided with an input and output interface 21, inputting and outputting the information, and a microprocessor processing the information from the input and output interface 21. Obviously, a part of or an entire portion of the input and output interface 21 may be included in the microprocessor. The ECU 20 is made of an electrical circuit, which has the microprocessor as a main component.

As shown in FIG. 5, an input system, where the information from the touch panel 10T, the front camera 12, the rear camera 13, the steering sensor 14, the shift position sensor 15, the acceleration sensor 16, the brake sensor 17, the rotation sensor 18, and the like is input, is formed in the input and output interface 21. An output system, which outputs a control signal to the monitor 10, the speaker 11, the power steering unit PS, the gearshift mechanism T, and the brake apparatus BK, is formed in the input and output interface 21. The front camera 12 corresponds to the image capturing portion capturing an image of the forward direction of the vehicle 1. Further, the monitor 10 corresponds to a display portion displaying captured images.

The ECU 20 has a plurality of functional parts connecting with the input and output interface 21. The connection is established, for example, via a data bus, an address bus, a control bus, a memory, and the like in the microprocessor. However, for ease of explanation, detailed figures and explanations are omitted.

Figure 6:
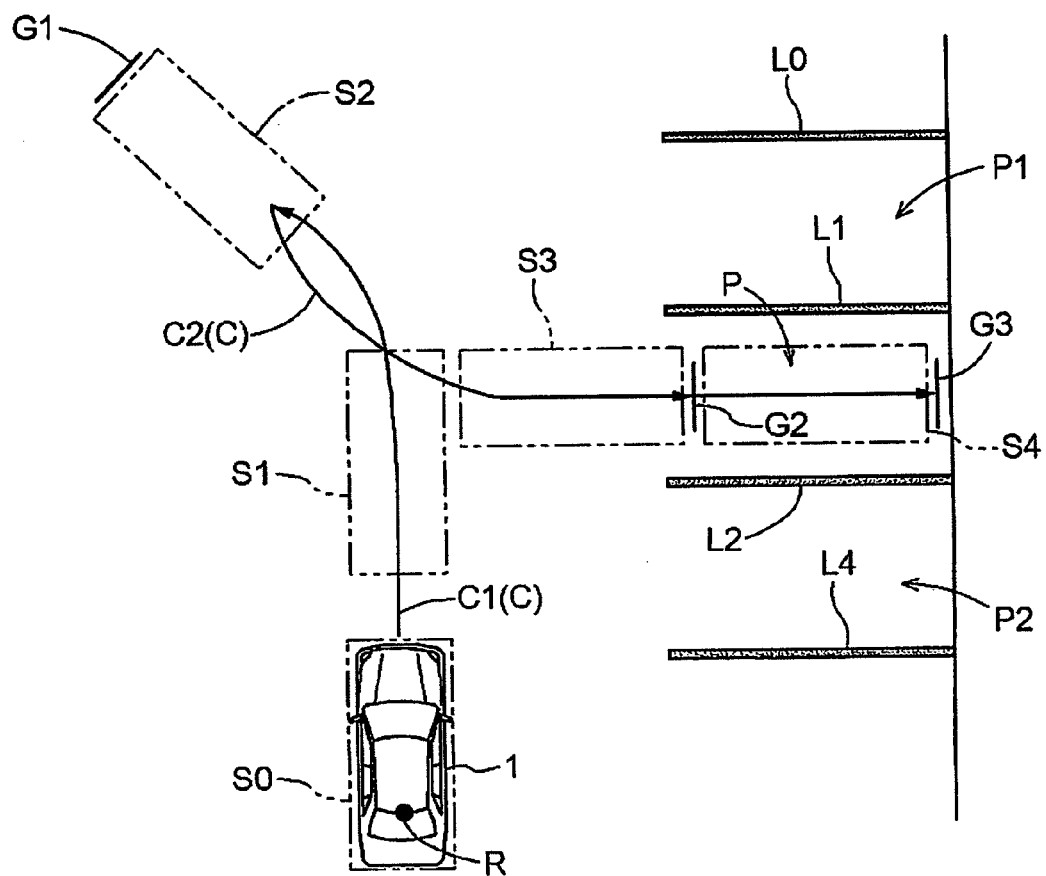
FIG. 6 is a diagram showing a path for guiding the vehicle to the parking position and a position of guide information.

As shown in FIG. 5, the ECU 20 has a parking target position setting portion 22, a rearward movement start position setting portion 23, a forward movement path calculating portion 24, a rearward movement path calculating portion 25, a superimposing portion 26, a moving state detecting portion 27, and a guide portion 28. In this embodiment, an example in which each functional part is achieved by cooperating the microprocessor and programs, is shown. However, each functional part may be configured by a hardware using logical circuits and the like. Hereinafter, an overview of each functional part will be explained with reference to FIG. 6 showing a path that is used for guiding the vehicle 1 to the parking position and a position of the guide information.

The parking target position setting portion 22 sets a parking target position S4 of the vehicle 1 when the vehicle 1 is in a predetermined stop position S1 based on the image captured by the front camera 12.

The rearward movement path calculating portion 25 calculates a rearward movement guide path C2 from a rearward movement start position S2, that is located anterior to the predetermined stop position S1 by the vehicle 1 and is a position where the vehicle 1 starts rearward movement for the parking, to the parking target position S4.

The rearward movement start position setting portion 23 sets the rearward movement start position S2 in a predetermined set range based on the image captured by the front camera 12 by following the instructions from the occupant of the vehicle 1. "The predetermined set range" will be explained below.

The forward movement path calculating portion 24 calculates the forward movement guide path C1 from the predetermined stop position S1 to the rearward movement start position S2.

The moving state detecting portion 27 detects the moving state of the vehicle 1. "The moving state" will be explained below.

The guide portion 28 guides the vehicle 1 from the predetermined stop position S1 to the rearward movement start position S2 based on the forward movement guide path C1 and the moving state. Further, the guide portion 28 guides the vehicle 1 from the rearward movement start position S2 to the parking target position S4 based on the rearward movement guide path C2 and the moving state.

The superimposing portion 26 conducts a superimposing process in which various messages including a marker which show the rearward movement start position and markers for guide are superimposed on the image captured by the front camera 12. As for these messages and markers for guide, the description including their purposes will be provided below. For example, the rearward movement start position setting portion 23 sets the rearward movement start position S2 in accordance with the occupant's instruction based on the marker showing the rearward movement start position.

Hereinafter, procedures of the parking assist apparatus of the present invention will be described using an example that the vehicle 1 is parked in the parking position P as shown in FIG. 6.

[Parking Target Position Setting Process]

Figure 7:
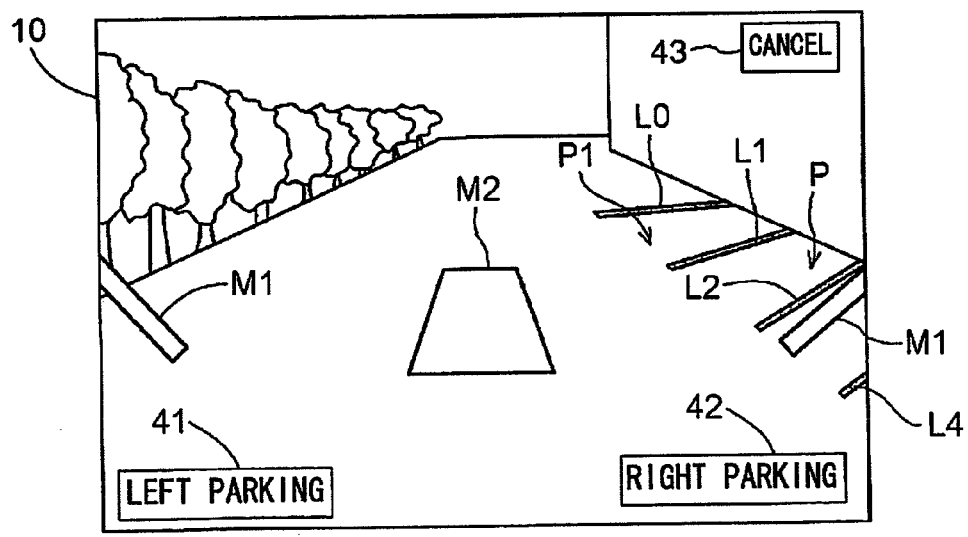
FIG. 7 is a diagram showing a display example of a monitor screen.

FIG. 7 shows a screen of the monitor 10, which displays the image captured by the front camera 12 of the vehicle 1 at a position S0 shown in FIG. 6 and the messages and markers generated by the superimposing portion 26. Here, a state that the parking assist apparatus has been activated is shown. The parking assist is classified broadly into the garage parking type and the parallel parking type. In this embodiment, it is assumed that the parking assist of the garage parking type has been selected. At this point, whether the vehicle is parked to a left direction or a right direction is not determined.

In FIG. 7, a front marker M2 is a rearward movement start position marker showing the rearward movement start position S2. In this state, the rearward movement start position marker M2 is superimposingly displayed on an initial position in a center of the screen. Left and right markers M1 are parking target position markers for setting the parking target position. In FIG. 7, whether the vehicle is parked to the left direction or the right direction has not been determined. Thus, message buttons 41 and 42, of "left parking" and "right parking", are shown in the screen of the monitor 10 including the touch pad 10T. The direction which the vehicle is parked is determined based on which button, the message button 41 or the message button 42, is pressed by the occupant. Alternatively, as described below, the switching between "left parking" and "right parking" may be conducted according to a steering direction of the steering wheel 4. In case of canceling the parking assist, the parking assist is terminated by touching a message button 43 of "Cancel". The function of the message button 43 of "Cancel" is similar to the foregoing description in each display described below.

Figure 8:
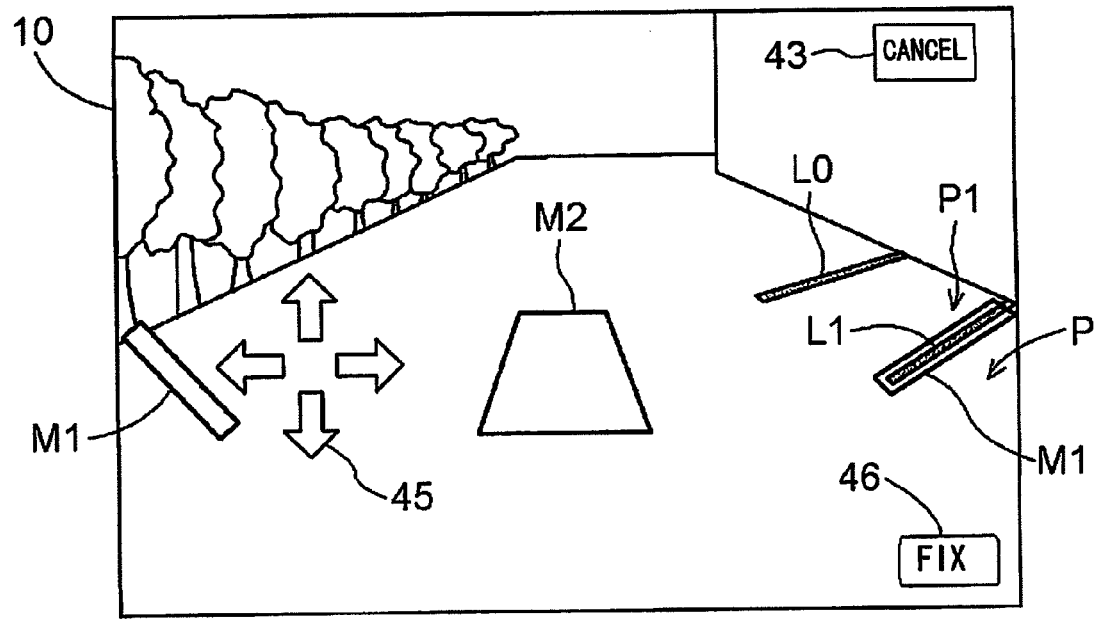
FIG. 8 is a diagram showing the display example of the monitor screen.

When the vehicle 1 reaches the predetermined stop position S1 shown in FIG. 6, as shown in FIG. 8, a line L1 of a parking lot and the right parking target position marker M1 are displayed, overlapping with each other. The occupant stops the vehicle 1 in this position. In certain stop positions S1 of the vehicle 1, the line L1 may be misaligned with the parking target position marker M1. However, this misalignment may be adjusted by operating a cursor 45. In case that the direction that the vehicle is parked has been determined, the message button 46 of "Fix" is displayed. The parking target position S4 is set by touching the message button 46. At the time, the left parking target position marker M1 is faintly displayed or may be deleted.

[Reward Movement Start Position Setting Process]

Figure 9:
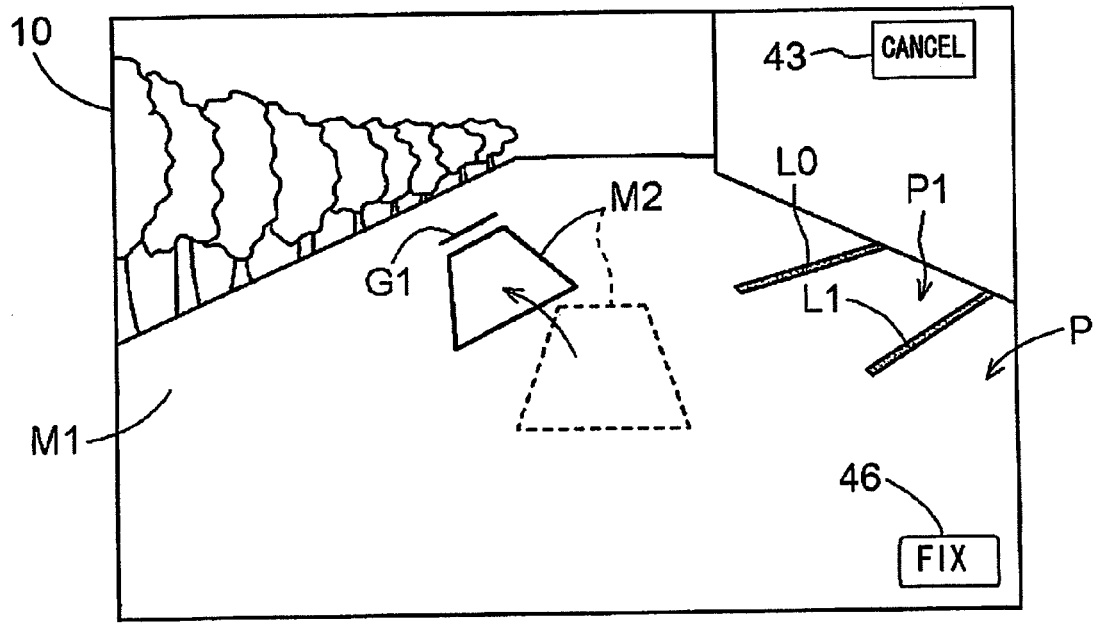
FIG. 9 is a diagram showing the display example of the monitor screen.

When the parking target position S4 is set, the rearward movement start position S2 is set in a state that the vehicle 1 is stopped. It is possible for the occupant to adjust the on-screen position of the reward movement start position marker M2 by operating the steering wheel 4. In the embodiment, since the vehicle is parked to the right side relative to a traveling direction, the steering wheel 4 is operated in a counter clockwise direction so as to set the reward movement start position S2 in a left forward direction. As shown in FIG. 9, the reward movement start position marker M2, superimposed on a front position of the vehicle 1 on the screen of the monitor 10, moves in the left direction in conjunction with the operation of the steering wheel 4.

As just described, the steering direction of the steering wheel 4 for setting the reward movement start position S2 is determined based on the direction that the vehicle is parked. Thus, the direction that the vehicle is parked may be switched by the steering direction without using the message buttons 41 and 42 of "left parking" and "right parking" as described above.

The rearward movement start position marker M2 is drawn in a position that the forward movement guide path C1, starting from the current stop position S1, can be formed. The forward movement guide path C1 is calculated by the forward movement path calculating portion 24.

Further, the rearward movement path calculating portion 25 calculates the rearward movement guide path C2 to the parking target position S4, setting a position specified by the rearward movement start position marker M2 as a tentative rearward movement start position S2. When the tentative rearward movement start position S2 is specified in a position that the rearward movement guide path C2 can not be formed, the parking assist apparatus informs that the setting is invalid in the current position of the rearward movement start position marker M2.

For example, the message button 46 of "Fix" shown in FIG. 8 is superimposed as a faint display by the superimposing portion 26. Further, even if the occupant touches the message button 46 in this state, any command is not accepted. Alternatively, the invalidity of the setting may be informed by a sound via the speaker 11.

Further, the invalidity of the setting may be informed by the rearward movement start position marker M2 itself. For example, when the parking target position marker M1 is determined in FIG. 8, the rearward movement start position marker M2 is displayed in red. As shown in FIG. 9, when the rearward movement start position marker M2 moves due to the operation of the steering wheel 4 and reaches the position that the rearward movement guide path C2 can be formed, the rearward movement start position marker M2 is displayed in green.

Thus, the occupant touches the message button 46 of "Fix" in a state that the position adjustment of the rearward movement guide path C2 is completed, thereby setting the rearward movement start position marker M2.

The occupant is able to arbitrarily set the rearward movement start position S2 within the predetermined set range. As is clear from the foregoing description, "the predetermined set range" is a range that the forward movement guide path C1 may be formed from the stop position S and the rearward movement guide path C2 can be formed from the set rearward movement start position S2 to the parking target position S4.

In the embodiment, the initial position of the rearward movement start position marker M2 is set to the center of the screen (refer to FIGS. 7 to 9), however, the initial position may be set to other positions. For example, a left forward position indicated by a solid line in FIG. 9 may be set as the initial position. In case that the occupant determines that there is no problem with the initial position, the rearward movement start position S2 may be set only by touching the message button of Fix without the need for adjustment of the rearward movement start position S2. In case that the adjustment is required, the rearward movement start position S2 may be adjusted to an appropriate position with a few operations.

Further, in case that an oblique position according to the parking position is set to the initial position at the time of the adjustment of the rearward movement start position S2 as described above, it is desirable to rotate the steering wheel 4 via the interlocked power steering unit PS.

[Guide Path Calculating Process (Forward Movement Path Calculating Process/Rearward Movement Path Calculating Process)]

Figure 10:
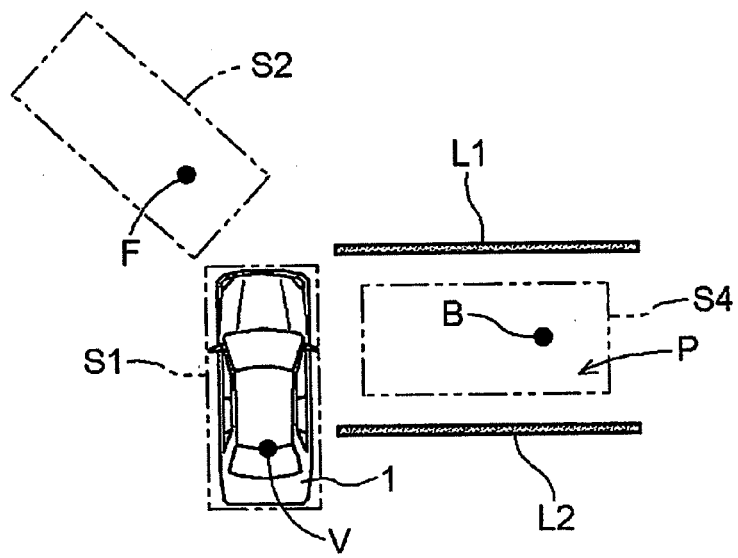
FIG. 10 is a diagram showing baselines of a stop position, a rearward movement start position, and a parking target position.

As described above, the rearward movement start position S2 and the parking target position S4 are set using the stop position S1 as the standard. As shown in FIG. 10, these are defined at an identical point of the vehicle 1 in each position, and the guide path C (the forward movement guide path C1 and the rearward movement guide path C2) is calculated based on these defined points.

A point V of the vehicle 1 in the stop position S1 is defined as a start point V. An identical point F of the vehicle 1 in the rearward movement start position S2 is defined as the reward movement start point F. An identical point B of the vehicle 1 in the parking target position S4 is defined as the parking target point B. A guide path C is calculated based on these three points.

As described above, the guide path calculating process is appropriately conducted in the reward movement start position setting process by the forward movement path calculating portion 24 and the rearward movement path calculating portion 25.

[Moving State Detecting Process]

The calculation is conducted assuming that the start point V is moved in a process that the vehicle 1 moves from the stop position S1 to the reward movement start position S2 and in a process that the vehicle 1 moves from the reward movement start position S2 to the parking target position S4.

The position information of the vehicle 1 (moving state) in a moving process is detected by the moving state detecting portion 27. The moving state detecting portion 27 detects the moving state of the vehicle 1 based on the input from the steering sensor 14, the rotation sensor 18, the acceleration sensor 16, the shift position sensor 15, the brake sensor 17, and the like as shown in FIG. 5. Thus, the moving state detecting portion 27 may be configured including these sensors. Further, other than the foregoing sensors, a yaw rate sensor (not shown) may be used for input to the moving state detecting portion 27.

Figure 11:
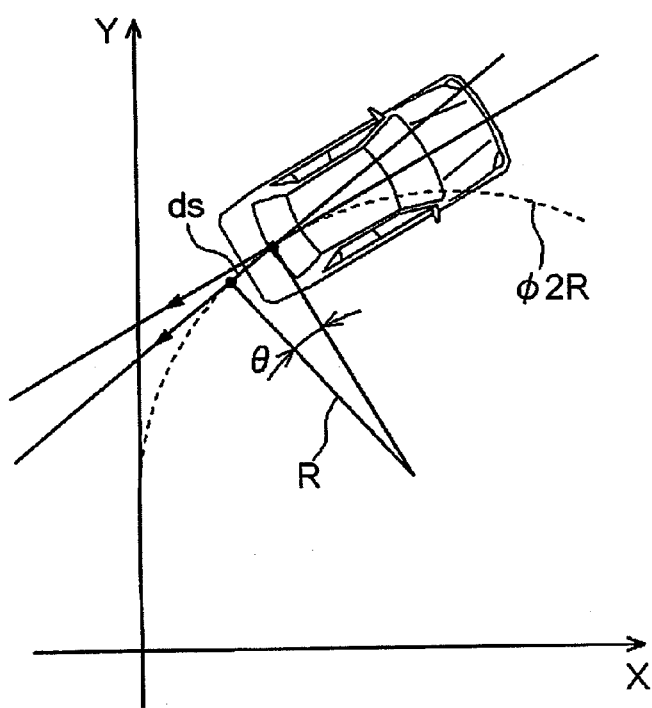
FIG. 11 is a diagram for explaining a calculation method to detect a position of the vehicle.
Figure 11:
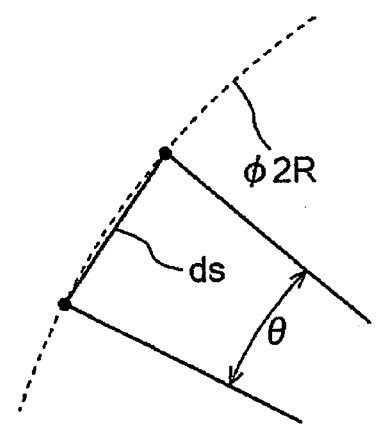

FIG. 11 shows an example in which a position change (moving state) of the vehicle 1 is detected based on the input from the steering sensor 14 and the rotation sensor 18. FIG. 11 shows rearward movement of the vehicle 1, which pivots with the radius of turn R. A broken line in the figure indicates a trajectory of the vehicle 1 which pivots with the radius of turn R, i.e. an arc having a diameter ø of 2R. FIG. 11 (*b*) is an enlarged fragmentary view of FIG. 11 (*a*). The moving state detecting portion 27 detects the moving state by integrating positional changes (infinitesimal moving distance) of the vehicle 1 in an infinitesimal time calculated by the radius of turn R of the vehicle 1.

ds shown in FIG. 11 and the below expressions (1) to (3) is the infinitesimal moving distance. The infinitesimal moving distance is calculated based on the input from the rotation sensor 18, for example. Further, the radius of turn of the vehicle 1 is calculated based on the input from the steering sensor 14. An integration range α in the expressions (1) to (3) shows a cumulative moving distance.

[Expression 1]

$$\theta = \int_0^\alpha \frac{1}{R} \cdot ds \quad (1)$$

$$X = \int_0^\alpha \sin\theta \cdot ds \quad (2)$$

$$Y = \int_0^\alpha \cos\theta \cdot ds \quad (3)$$

[Forward Movement Guide Process (Guide Process)]

As described above, when the rearward movement start position S2 and the parking target position S4 are set, the guide portion 28 guides the vehicle 1 from the stop position S1 to the rearward movement start position S2. The guidance is conducted based on the forward movement guide path calculated in the forward movement path calculating process and the moving state calculated in the moving state detecting process.

An example that the vehicle 1 is automatically operated by the guide portion 28 and moves from the stop position S1 to the reward movement start position S2 will be described below. The occupant releases the brake pedal 8 to start the vehicle 1 after touching the message button 46 of "Fix" for the rearward movement start position S2 on the screen of FIG. 9. The guide portion 28 controls the power steering unit PS and the gearshift mechanism T so as to follow the forward movement guide path C1 calculated by the forward movement path calculating portion 24. At that time, an initial rudder angle is a steering angle that is operated so as to set the rearward movement start position S2 in the foregoing rearward movement start position setting process. Thus, the initial rudder angle is set at the time of the start of the vehicle 1, and the vehicle 1 is able to follow the forward movement guide path C1 without a time lag.

Figure 12:
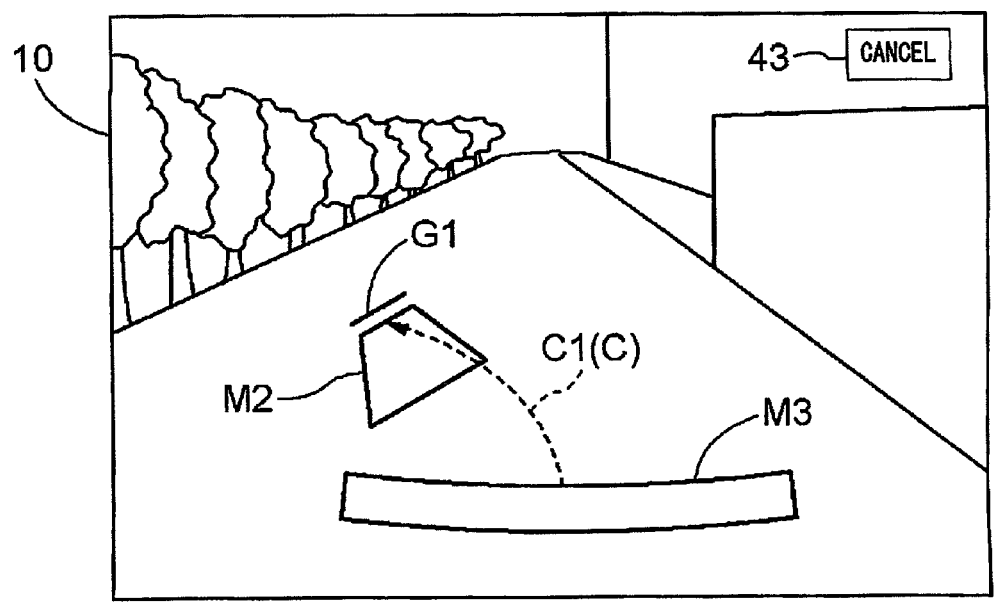
FIG. 12 is a diagram showing the display example of the monitor screen.
Figure 13:
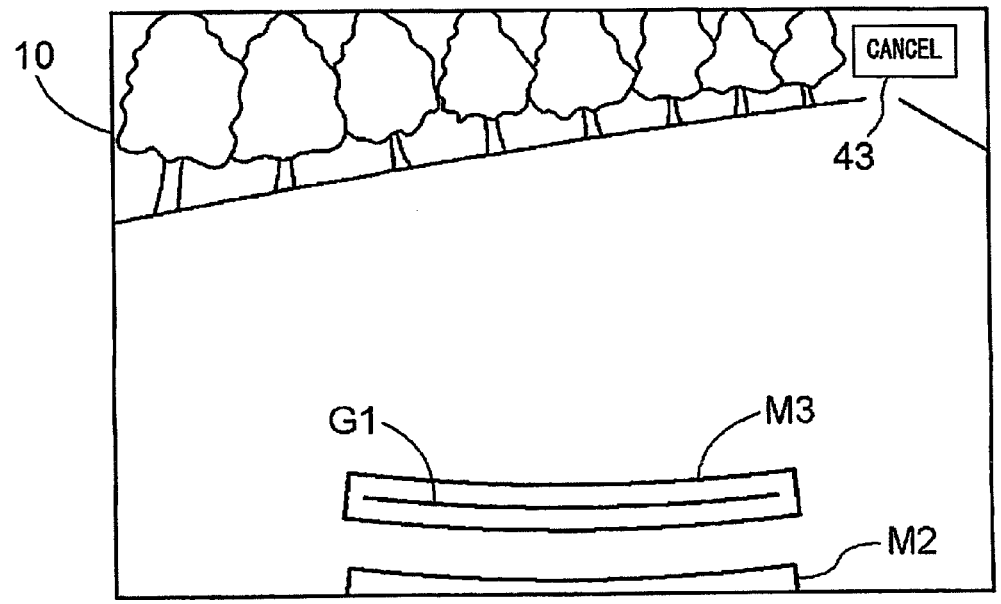
FIG. 13 is a diagram showing the display example of the monitor screen.

As shown in FIG. 12, the forward movement guide G1 is superimposingly displayed anterior to the reward movement start position marker M2. The guide marker M3 is superimposingly displayed at a forward position that is a predetermined distance away from the vehicle 1. As shown in FIG. 13, the vehicle 1 is in the reward movement start position S2 when the forward movement guide G1 and the guide marker M3 are overlapped. Other than this type of screen, the state may be announced by voice.

The occupant depresses the brake pedal 8 to stop the vehicle 1 after confirming that the forward movement guide G1 and the guide marker M3 are overlapped. The vehicle 1 may be stopped automatically by controlling the brake apparatus BK.

Further, the vehicle 1 may be moved to the reward movement start position S2 by manual operation, not automatic operation. In this case, the guide portion 28 shows the display which is similar to the foregoing description on the monitor 10 and instructs the driver how to steer by the display or voice. For example, the guide portion 28 instructs the driver to maintain the steering angle, which is set when setting the reward movement start position S2, at the beginning of the movement and return to a neutral position in conjunction with the movement. Further, in certain path setting of the forward movement guide path C1, the guide portion 28 instructs the driver to maintain the steering angle from the beginning of the movement to a point that the vehicle 1 reaches the rearward movement start position S2 and return to the neutral position in the state that the vehicle is stopped after reaching the rearward movement start position S2.

[Rearward Movement Guide Process (Guide Process)]

Figure 14:
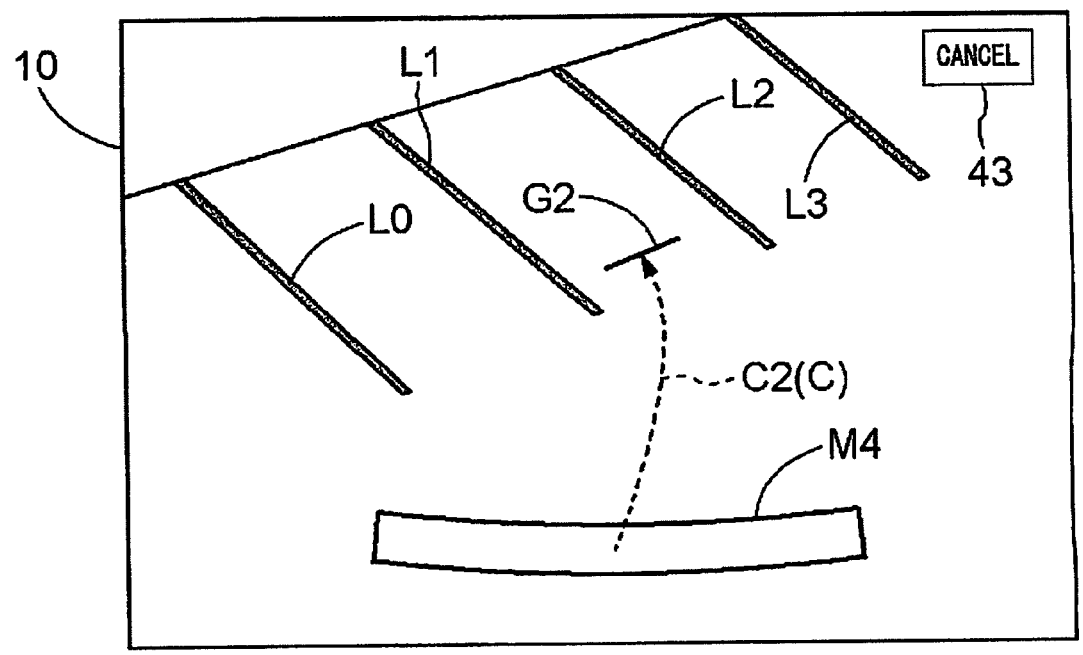
FIG. 14 is a diagram showing the display example of the monitor screen.

When the vehicle 1 is guided to the rearward movement start position S2, the image displayed on the monitor 10 is changed from the image captured by the front camera 12 to the image captured by the rear camera 13. FIG. 14 shows an example of the display to the monitor 10 when the camera is switched in the rearward movement start position S2. Similarly to the guide marker M3, the guide marker M4 is superimposingly displayed at a rearward position which is a predetermined distance away from the vehicle 1. Further, a rearward movement intermediate position guide G2 is displayed. The rearward movement intermediate position guide G2 is a guide for guiding the vehicle 1 to a rearward movement intermediate position S3 shown in FIG. 6. As shown in FIG. 6, the vehicle 1 moves rearward with pivoting from the rearward movement start position S2 to the rearward movement intermediate position S3. The vehicle 1 moves straight rearward without pivoting from the rearward movement intermediate position S3 to the parking target position S4.

The occupant releases the brake pedal 8 to start the vehicle 1 after confirming that the screen image of the monitor 10 is switched to the image from the rear camera 13. In case of the automatic operation, the guide portion 28 controls the power steering unit PS and the gearshift mechanism T so that the vehicle 1 follows the rearward movement guide path C2 calculated by the rearward movement path calculating portion 25.

Figure 15:
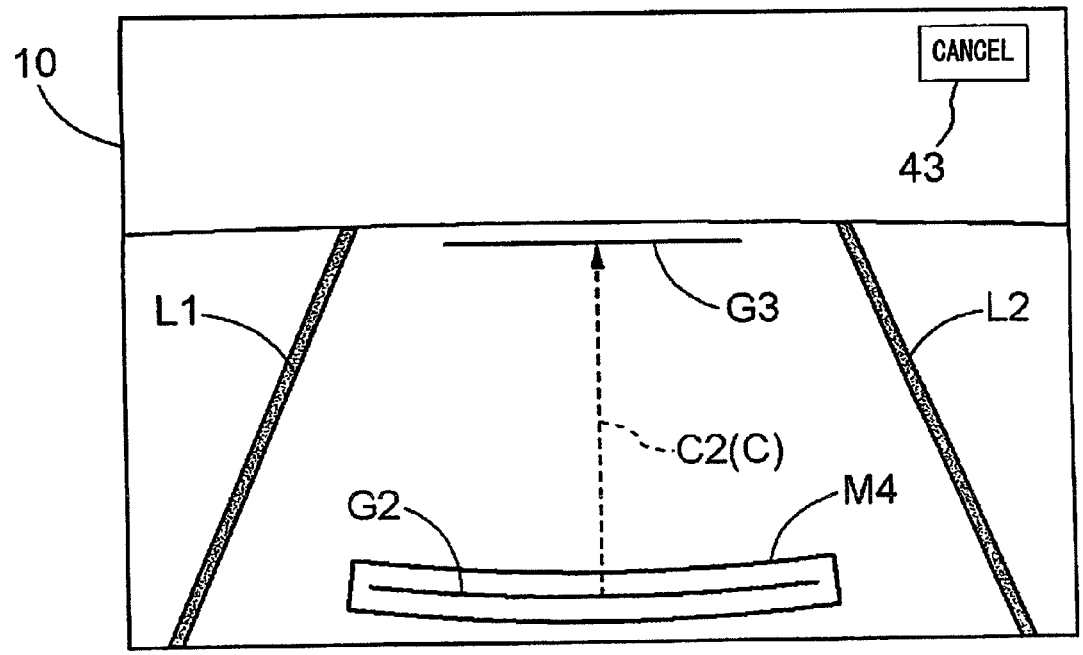
FIG. 15 is a diagram showing the display example of the monitor screen.

As shown in FIG. 15, the vehicle 1 is in the rearward movement intermediate position S3, when the rearward movement intermediate position guide G2 and the guide marker M4 are overlapped. It is similar to the forward movement in that the state may be announced by voice.

The occupant depresses the brake pedal 8 to stop the vehicle 1 after confirming that the rearward movement intermediate position guide G2 and the guide marker M4 are overlapped. Obviously, the guide portion 28 may control the brake apparatus BK to stop the vehicle 1 automatically.

Similarly to the forward movement, the vehicle 1 may be moved to the rearward movement intermediate position S3 by manual operation, not automatic operation. In this case, the guide portion 28 shows the display which is similar to the foregoing description on the monitor 10 and instructs the driver how to steer by the display or voice. For example, the guide portion 28 instructs the driver to set the steering angle for the rearward movement at the beginning of the movement and return to the neutral position in the state that the vehicle 1 is stopped after moving to the rearward movement intermediate position S3. Obviously, the guide portion 28 may instruct the driver to change the steering angle frequently along the rearward movement guide path C2.

When the rearward movement intermediate position guide G2 and the guide marker M4 are overlapped and the vehicle 1 stops, the parking position guide G3 for the parking target position S4 is displayed as shown in FIG. 15. Obviously, the parking position guide G3 may be displayed in the screen of FIG. 14. The occupant releases the brake pedal 8 to start the vehicle 1 by alarm of one or both of screen and sound. In case of the automatic operation, the guide portion 28 controls the power steering unit PS and the gearshift mechanism T so that the vehicle 1 follows the rearward movement guide path C2. In this case, since the rearward movement guide path C2 is a rearward straight path, the power steering unit PS is controlled so as to maintain the straight movement.

The vehicle 1 is in the parking target position S4, when the parking position guide G3 and the guide marker M4 are overlapped. It is similar to the forward movement in that the state may be announced by voice.

The occupant depresses the brake pedal 8 to stop the vehicle 1 after confirming that the parking position guide G3 and the guide marker M4 are overlapped. Obviously, the guide portion 28 may control the brake apparatus BK to stop the vehicle 1 automatically.

Alternatively, similarly to the foregoing description, the manual operation may be conducted.

As described above, according to the invention, a parking assist apparatus, which allows the occupant of the vehicle to set the position where the vehicle starts moving rearward for parking, is provided.

INDUSTRIAL APPLICABILITY

The present invention can be applied to a parking assist apparatus which assists a driving operation when parking a vehicle.

The invention claimed is:

1. A parking assistance apparatus assisting a driving operation for parking comprising:
    an image capturing portion capturing an image of a forward direction of a vehicle;
    a display portion displaying a captured image;
    a parking target position setting portion setting a parking target position of the vehicle based on the captured image when the vehicle is in a predetermined stop position;
    a rearward movement path calculating portion calculating a rearward movement guide path from a rearward movement start position, which is located anterior to the predetermined stop position by the vehicle and is a position where the vehicle starts rearward movement for a parking, to the parking target position;
    a rearward movement start position setting portion setting the rearward movement start position within a predetermined set range based on the captured image by following an instruction from an occupant of the vehicle when the vehicle is in the predetermined stop position;
    a forward movement path calculating portion calculating a forward movement guide path from the predetermined stop position to the rearward movement start position;
    a moving state detecting portion detecting a moving state of the vehicle; and
    a guide portion guiding the vehicle from the predetermined stop position to the rearward movement start position based on the forward movement guide path and based on the moving state, and
    a superimposing portion superimposing a marker showing the rearward movement start position on the captured image, wherein the rearward movement start position setting portion sets the rearward movement start position by the instruction of the occupant of the vehicle based on the marker.

2. The parking assist apparatus according to claim 1, wherein the rearward movement start position is set at a position instructed by a steering operation of the occupant.

3. The parking assist apparatus according to claim 2, wherein an initial rudder angle of the forward movement guide path is a steering angle operated in order for instructing the rearward movement start position.

4. The parking assist apparatus according to claim 1, wherein the predetermined set range of the rearward movement start position is a range where the rearward movement guide path is formed.

5. The parking assist apparatus according to claim 1, wherein the guide portion guides the vehicle from the rearward movement start position to the parking target position based on the rearward movement guide path and the moving state.

6. The parking assist apparatus according to claim 1 further comprising;
    a superimposing portion superimposing a marker showing the rearward movement start position on the captured image, wherein the rearward movement start position setting portion moves a position of the marker on the captured image in conjunction with the instruction of the occupant within a predetermined area of the captured image.

7. The parking assist apparatus according to claim 1, wherein the predetermined set range is a range that the forward movement guide path is formed from the predetermined stop position and the rearward movement guide path is formed from the set rearward movement start position to the parking target position.

* * * * *